United States Patent
Wilbers et al.

(10) Patent No.: US 11,940,291 B2
(45) Date of Patent: Mar. 26, 2024

(54) METHOD FOR UPDATING A MAP OF THE SURROUNDING AREA, DEVICE FOR EXECUTING METHOD STEPS OF SAID METHOD ON THE VEHICLE, VEHICLE, DEVICE FOR EXECUTING METHOD STEPS OF THE METHOD ON A CENTRAL COMPUTER, AND COMPUTER-READABLE STORAGE MEDIUM

(71) Applicants: VOLKSWAGEN AKTIENGESELLSCHAFT, Wolfsburg (DE); MAN TRUCK & BUS SE, Munich (DE)

(72) Inventors: Daniel Wilbers, Wolfsburg (DE); Christian Merfels, Braunschweig (DE); Bernd Rech, Bokensdorf (DE); Thilo Schaper, Lehrte (DE); Niklas Koch, Wolfsburg (DE); Stefan Jürgens, Braunschweig (DE); David Perdomo Lopez, Braunschweig (DE); Constanze Hungar, Braunschweig (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 191 days.

(21) Appl. No.: 17/263,045

(22) PCT Filed: Jul. 25, 2019

(86) PCT No.: PCT/EP2019/070041
§ 371 (c)(1),
(2) Date: Jan. 25, 2021

(87) PCT Pub. No.: WO2020/021009
PCT Pub. Date: Jan. 30, 2020

(65) Prior Publication Data
US 2021/0310823 A1    Oct. 7, 2021

(30) Foreign Application Priority Data
Jul. 27, 2018    (DE) ..................... 10 2018 118 215.5

(51) Int. Cl.
*G01C 21/00* (2006.01)
(52) U.S. Cl.
CPC ...... *G01C 21/3863* (2020.08); *G01C 21/3811* (2020.08); *G01C 21/3815* (2020.08);
(Continued)
(58) Field of Classification Search
CPC ............ G01C 21/3811; G01C 21/3815; G01C 21/3833; G01C 21/387; G01C 21/3863; G01C 21/3848
See application file for complete search history.

(56) References Cited

U.S. PATENT DOCUMENTS

| 9,360,331 B2 | 6/2016 | Von Zitzewitz et al. |
| 2008/0262717 A1 | 10/2008 | Ettinger |

(Continued)

FOREIGN PATENT DOCUMENTS

| CN | 107295047 A | 10/2017 |
| CN | 108205133 A | 6/2018 |

(Continued)

OTHER PUBLICATIONS

Search Report for International Patent Application No. PCT/EP2019/070041; dated Nov. 14, 2019.
(Continued)

*Primary Examiner* — Hunter B Lonsberry
*Assistant Examiner* — Harrison Heflin
(74) *Attorney, Agent, or Firm* — Barnes & Thornburg LLP (57) ABSTRACT

A method for updating a map of the surrounding area wherein the map is used when controlling a transportation vehicle. The transportation vehicle attempts, when travelling along a carriageway, to detect a landmark recorded in the map of the surrounding area using sensors. In response to the transportation vehicle being unable to detect the landmark using its sensors, the transportation vehicle prepares a proposal for deletion which is sent to an external central computer. The proposal for deletion is examined in the external central computer and deletes the landmark from the map of the surrounding area in response to the proposal for (Continued)

deletion being verified. In the method, information regarding a visibility range for the landmark is entered in the map of the surrounding area specifying at what range the landmark is visible from a road permitting a more effective detection of landmarks.

17 Claims, 7 Drawing Sheets

(52) U.S. Cl.
CPC ..... *G01C 21/3833* (2020.08); *G01C 21/3848* (2020.08); *G01C 21/387* (2020.08)

(56) References Cited

U.S. PATENT DOCUMENTS

| | | | | |
|---|---|---|---|---|
| 2012/0230550 | A1* | 9/2012 | Kraut | G05D 1/0274 |
| | | | | 382/113 |
| 2013/0238234 | A1* | 9/2013 | Chao | G06V 10/40 |
| | | | | 701/409 |
| 2014/0257688 | A1 | 9/2014 | Chao et al. | |
| 2016/0117348 | A1* | 4/2016 | Reynertson | G06F 16/5866 |
| | | | | 707/769 |
| 2016/0234652 | A1* | 8/2016 | Chao | H04W 4/33 |
| 2018/0137742 | A1* | 5/2018 | Zhang | G08G 1/0969 |
| 2018/0188045 | A1* | 7/2018 | Wheeler | H04L 67/52 |
| 2019/0017842 | A1* | 1/2019 | Moore | G01C 21/3682 |
| 2020/0249032 | A1* | 8/2020 | Lee | G01C 21/32 |
| 2020/0386572 | A1 | 12/2020 | Kubertschak | |
| 2021/0003420 | A1* | 1/2021 | Hamperl | G06V 20/56 |
| 2021/0097103 | A1* | 4/2021 | Kang | G06N 3/08 |

FOREIGN PATENT DOCUMENTS

| | | |
|---|---|---|
| DE | 102008041679 A1 | 3/2010 |
| DE | 102010006828 A1 | 8/2011 |
| DE | 102011084993 A1 | 4/2013 |
| DE | 102015010542 A1 | 2/2016 |
| DE | 102014217847 A1 | 3/2016 |
| DE | 102016008175 A1 | 1/2018 |
| DE | 202018100752 U1 | 3/2018 |
| JP | 2016218505 A | 12/2016 |

OTHER PUBLICATIONS

Office Action; Chinese Patent Application No. 201980047846.1; dated Sep. 28, 2023.

* cited by examiner

FIG. 9 ively. The concept of autonomous driving has various gradations. At certain levels, autonomous driving also refers to a situation in which a driver is still present in the transportation vehicle and, where appropriate, performs only the monitoring of the automatic driving process. In Europe, the different traffic ministries (in Germany, the Bundesanstalt für Straßenwesen ["Federal Highway Research Institute"] participated) have collaborated and defined the following autonomy levels:

METHOD FOR UPDATING A MAP OF THE SURROUNDING AREA, DEVICE FOR EXECUTING METHOD STEPS OF SAID METHOD ON THE VEHICLE, VEHICLE, DEVICE FOR EXECUTING METHOD STEPS OF THE METHOD ON A CENTRAL COMPUTER, AND COMPUTER-READABLE STORAGE MEDIUM

PRIORITY CLAIM

This patent application is a U.S. National Phase of International Patent Application No. PCT/EP2019/070041, filed 25 Jul. 2019, which claims priority to German Patent Application No. 10 2018 118 215.5, filed 27 Jul. 2018, the disclosures of which are incorporated herein by reference in their entireties.

SUMMARY

Illustrative embodiments provide a method for updating a map of a surrounding area which is used in the control of a transportation vehicle, a device for the execution of the method in a transportation vehicle, a transportation vehicle, and a computer-readable storage medium for use in the method.

BRIEF DESCRIPTION OF THE DRAWINGS

Disclosed embodiments are shown in the drawings and are explained in detail below with reference to the figures, wherein.

DETAILED DESCRIPTION

Autonomous driving systems will be used in transportation vehicles in the near future, whereby the driver will no longer be constantly occupied with the task of driving and can carry out secondary activities (reading, sleeping, writing messages, etc.).

Autonomous driving (sometimes also referred to as automatic driving, automated driving or piloted driving) is to be understood to mean the movement of transportation vehicles, mobile robots and driverless transport systems which behave largely autonomously. The concept of autonomous driving has various gradations. At certain levels, autonomous driving also refers to a situation in which a driver is still present in the transportation vehicle and, where appropriate, performs only the monitoring of the automatic driving process. In Europe, the different traffic ministries (in Germany, the Bundesanstalt für Straßenwesen ["Federal Highway Research Institute"] participated) have collaborated and defined the following autonomy levels:

Level 0: "driver only", the driver himself drives, steers, accelerates, brakes, etc.

Level 1: specific assistance systems help with transportation vehicle operation (inter alia, an Automatic Cruise Control ACC).

Level 2: partial automation. Inter alia, automatic parking, lane-keeping function, general longitudinal guidance, acceleration, braking, etc. are performed by the assistance systems (including congestion assistant).

Level 3: high-level automation. The driver does not have to monitor the system constantly. The transportation vehicle independently performs functions such as activating the indicator, lane-changing and lane-keeping. The driver can apply himself to other tasks, but, if required, is prompted by the system within a warning time to take over the driving. This form of autonomy is technically feasible on highways. The legislative authority is working on the approval of Level 3 vehicles. The legal boundary conditions have already been established for this purpose.

Level 4: full automation. The driving of the transportation vehicle is performed constantly by the system. If the system can no longer cope with the driving tasks, the driver can be prompted to take over the driving.

Level 5: no driver required. Apart from setting the destination and starting the system, no human intervention is required.

The Verband der Automobilindustrie (VDA) ["German Automotive Industry Association"] has published its own definition of the different levels for the degree of automation.

Automated driving functions from level 3 remove responsibility for controlling the transportation vehicle from the driver. Self-localization of the transportation vehicle is hugely important for automated driving systems of this type. Position determination based on the known GNSS systems, corresponding to the Global Navigation Satellite System, such as GPS (Global Positioning System), is inadequate for this purpose. Very precise maps of a surrounding area are used in the automated driving systems to increase the accuracy of the position determination. The transportation vehicle "scans" the surrounding area, wherein imaging sensors such as video cameras, infrared cameras, LIDAR (Light Detection and Ranging) sensors, RADAR (Radio Detection and Ranging) sensors and ultrasound sensors are used for this purpose. The distances to specific features of the surrounding area recorded in the map, which are also referred to as landmarks, are determined through evaluation of the images captured by the sensors. This then results in an improved accuracy in the self-localization. More recent autonomous functions or the more recent driver assistance systems, such as a "road works assistant", can therefore then be implemented.

Various concepts are already known for the self-localization of automatically driving transportation vehicles. In some concepts, structures and patterns in the surrounding area of the transportation vehicle, referred to collectively as features of the surrounding area (e.g., landmarks), are detected by the transportation vehicle sensors and are compared with corresponding entries in a map which is available in the transportation vehicle (e.g., "Road DNA™" from the company TOMTOM®, "Road Data Base™" from cooperation partners Continental and Ygomi, etc.). These concepts require a map that is as precise and up-to-date as possible with the recorded features of the surrounding area.

The term "feature of the surrounding area" generally relates to characteristic features in the surrounding area of an object. The term "landmark" is often used synonymously below. The term "landmark" is often understood to mean a clearly visible feature of the surrounding area. Examples of landmarks include a deployed maritime aid to navigation such as a lighthouse or other conspicuous, usually highly visible, topographical object. Churches, towers, wind turbines, castles, mountains or free-standing, distinctive tall trees, for example, can accordingly represent landmarks. They play an important part in spatial orientation and terrestrial navigation and are therefore indicated, where appropriate, on maps by special map symbols. However, this may also include a feature of the surrounding area that is clearly visible on the roadway, such as roadway markings on the roadway, e.g., traffic lane markings, direction arrows, stop lines, etc.

A driver assistance system, a traffic telematics system and a method for updating a digital map are known from DE 10 2014 217 847 A1. If a difference is noted between a landmark recorded in the map and the surrounding area detected by environment sensors, a comparison is made with the features in the surrounding area determined by adjacent transportation vehicles. If a plurality of transportation vehicles report the same observation, the difference is used to update the digital map.

A method for creating a digital map of a surrounding area is known from DE 10 2015 010 542 A1. Objects or obstacles are detected by environment sensors. A route actually travelled by the transportation vehicle is compared with a route in the map of the surrounding area and updated map information is generated on the basis thereof and is stored in the map of the surrounding area.

A method for updating an electronic geographical map is known from DE 10 2016 008 175 A1. The object data derived from the environment sensors of a transportation vehicle are transmitted to an external computing device. The external computing device uses these object data and creates an updated electronic map.

The maps must therefore be frequently updated. This is done by a download via a communication interface in the transportation vehicle. In reality, however, by the time a map has been updated, it is already obsolete. On the road, as in the surrounding area of the roads, changes are constantly taking place, e.g., due to roadworks, so that landmarks which are recorded in the map disappear or are concealed and new landmarks are added. The correctness of landmarks recorded in the map must therefore be constantly monitored. This is done with the environment sensors. If the environment sensors identify a discrepancy compared with the information stored on the digital map, the position of the transportation vehicle can no longer be reliably determined with high precision. It is then therefore necessary to determine the position with additional measures. Landmarks which are still recorded in the map, but are already no longer present in reality, should be deleted as quickly as possible from the map so that no errors occur during self-localization or during the localization of transportation vehicles in the surrounding area.

Disclosed embodiments tackle the problem of updating the map. One of the tasks here involves determining whether features of the surrounding area recorded in the map are to be deleted because they no longer exist, new features of the surrounding area are to be added to the map, or the entries have to be corrected, e.g., due to structural changes.

The task can in turn be subdivided into two parts: the detection of the features of the environment by the sensor system of a transportation vehicle, the preprocessing in the transportation vehicle and the evaluation of the information from one or optionally a plurality of transportation vehicles in an external central computing unit (backend server), and the creation and publication of the map update.

Disclosed embodiments devise a solution for finding and deleting obsolete features of a surrounding area recorded in the map which no longer exist in the real surrounding area. The solution is intended to incur minimal cost, but at the same time meeting safety requirements.

This is achieved by a method for updating a map of a surrounding area which is used when controlling a transportation vehicle, a device for executing the method in the transportation vehicle, a transportation vehicle, a device for executing the method in a central computer, and a computer-readable storage medium.

The proposed method for updating a map of a surrounding area comprises the following method operations. The map of a surrounding area is typically used in the control of a transportation vehicle. According to the proposed method, the transportation vehicle, when driving on a roadway, attempts to detect a landmark recorded in the map of the surrounding area (UK) using sensors. If the landmark could not be detected using sensors, a deletion hypothesis is developed by the transportation vehicle and transmitted to an external central computer (backend server). The deletion hypothesis is verified in the external central computer and, if the deletion hypothesis is verified, the landmark is deleted from the map of the surrounding area in accordance with the deletion hypothesis. The method is characterized in that information relating to a visibility range for the landmark is recorded in the map of the surrounding area, indicating the range within which the landmark is visible from a road. The indication of the visibility range allows a substantially more effective detection of landmarks recorded in the map of the surrounding area. If it is evident that the transportation vehicle is still traveling outside the visibility range of the landmark, the complex detection using sensors and/or evaluation of the sensor data does/do not need to be performed. On the one hand, this allows a lower-cost computing device to be used for the sensor data evaluation. On the other hand, it reduces the power consumption, which, on the one hand, is more environmentally friendly and, on the other hand, increases the range in the case of electric transportation vehicles. Furthermore, the data volume for the transmission to the backend is also reduced. The transmission costs for using the mobile radio communication service can be reduced as a result. Furthermore, fewer deletion hypotheses need to be processed in the backend.

Different options exist for indicating the visibility range. One option comprises the indication of the visibility range by indicating the circle segments of the circle in the center of which the landmark is positioned. Here, however, the transportation vehicle must calculate a circle around the landmark in the center, define the visibility range and calculate whether it has already driven into the visibility range.

The computing task is somewhat less complex if the roadway segments of a roadway on which the transportation vehicle is traveling and from which the landmark is detectable are indicated in the map of the surrounding area. The position of the transportation vehicle is known with a relatively high precision via the GNSS navigation system and the transportation vehicle can thus easily check whether it is already driving in the visibility range.

It is beneficial if the roadway segments have a defined length and only those roadway segments of the roadway on which the transportation vehicle is travelling in which the landmark is completely detectable using sensors when passing through the roadway segment are recorded as the visibility area in the map of the surrounding area. Failed attempts to detect the landmark in presumably valid roadway segments are thus avoided.

A further alternative for indicating the visibility range comprises recording in the map of the surrounding area a number of further landmarks from which a line of sight to the verified landmark exists. An expectation as to whether a feature of the surrounding area ought to be visible can be indirectly determined as a result. This option is possibly less precise, depending on the surrounding area, but reduces the volume of data required to indicate the visibility range.

It is also highly beneficial for increasing the precision of the visibility range indication if the visibility range is indicated separately for the different lanes of a roadway.

A further beneficial measure comprises detecting a temporary concealment of landmarks by obstacles and in suspending the detection of landmarks using sensors on those roadway sections on which an obstacle by which a line of sight to such landmarks is blocked has been identified through detection using sensors. This substantially reduces the computing requirement in the transportation vehicle for the detection of landmarks using sensors.

A further beneficial measure comprises performing a multiple, successive detection of the landmark to corroborate the deletion hypothesis, wherein, for the multiple, successive detection of the landmark, a minimum driving distance is predefined which the transportation vehicle must have travelled before it attempts the next detection of the landmark. It is thus ensured that the respective detection of the landmark is performed from a different perspective.

The central computer may transmit a request to a number of further transportation vehicles which are travelling in the area in which the landmark concerned is located to verify the deletion hypothesis. These transportation vehicles for their part then attempt to detect the landmark concerned using sensors and to transmit a report on the result of the attempt back to the external central computer.

The deletion hypothesis is verified if a sufficient certainty exists that the deletion hypothesis is correct through statistical evaluation of the reports on the results of the attempt.

It is beneficial for a device in the transportation vehicle if the device is designed for the performance of the method in the transportation vehicle.

It is beneficial if the device is equipped with at least one computing device which is configured to execute at least the operations of evaluating the data for the detection of a landmark using sensors, developing a deletion hypothesis if the detection of the landmark using sensors fails, and evaluating a map of the surrounding area for the detection of the landmark using sensors, wherein, during the evaluation of the map of the surrounding area, the computing device evaluates the information relating to the visibility range for the landmark to be detected which is recorded in the map of the surrounding area. The benefit already specified above for the corresponding method operations therefore applies here also.

It is equally beneficial if the computing device is configured to evaluate the data from environment sensors to determine whether landmarks are temporarily concealed by obstacles, and to suspend the detection of landmarks using sensors on those roadway sections on which an obstacle by which a line of sight to such landmarks is blocked has been identified through the detection using sensors.

It is beneficial for the further corroboration of the deletion hypothesis if the computing device is configured to perform a multiple, successive detection of the landmark, wherein, for the multiple, successive detection of the landmark, a minimum driving distance is predefined which the transportation vehicle must have travelled before it attempts the next detection of the landmark. The reliability of the corroboration is thereby increased, since it is ensured that the landmark could no longer be detected from a plurality of different perspectives.

The described device can be used in transportation vehicles which use a very precise map of a surrounding area to perform the self-localization for an autonomous driving function.

It is beneficial for a device in the central computer if the device is designed to execute the method in the central computer.

In at least one disclosed embodiment, the device has at least one computing device which is configured to update a map of a surrounding area and to record information relating to the visibility range for a landmark in the map of the surrounding area, indicating the range within which the landmark is visible from a road.

The proposal can further be implemented as a computer-readable storage medium. This storage medium can be used in the disclosed method and also in the disclosed devices. A map of the surrounding area in which information relating to a visibility range for a landmark is recorded, indicating the range within which the landmark is visible from a road, is stored in the computer-readable storage medium.

The present description illustrates the principles of the disclosure. Persons skilled in the art will therefore obviously be capable of designing a variety of arrangements which are not explicitly described here, but embody principles of the disclosure are similarly intended to be fully protected.

Figure 1:
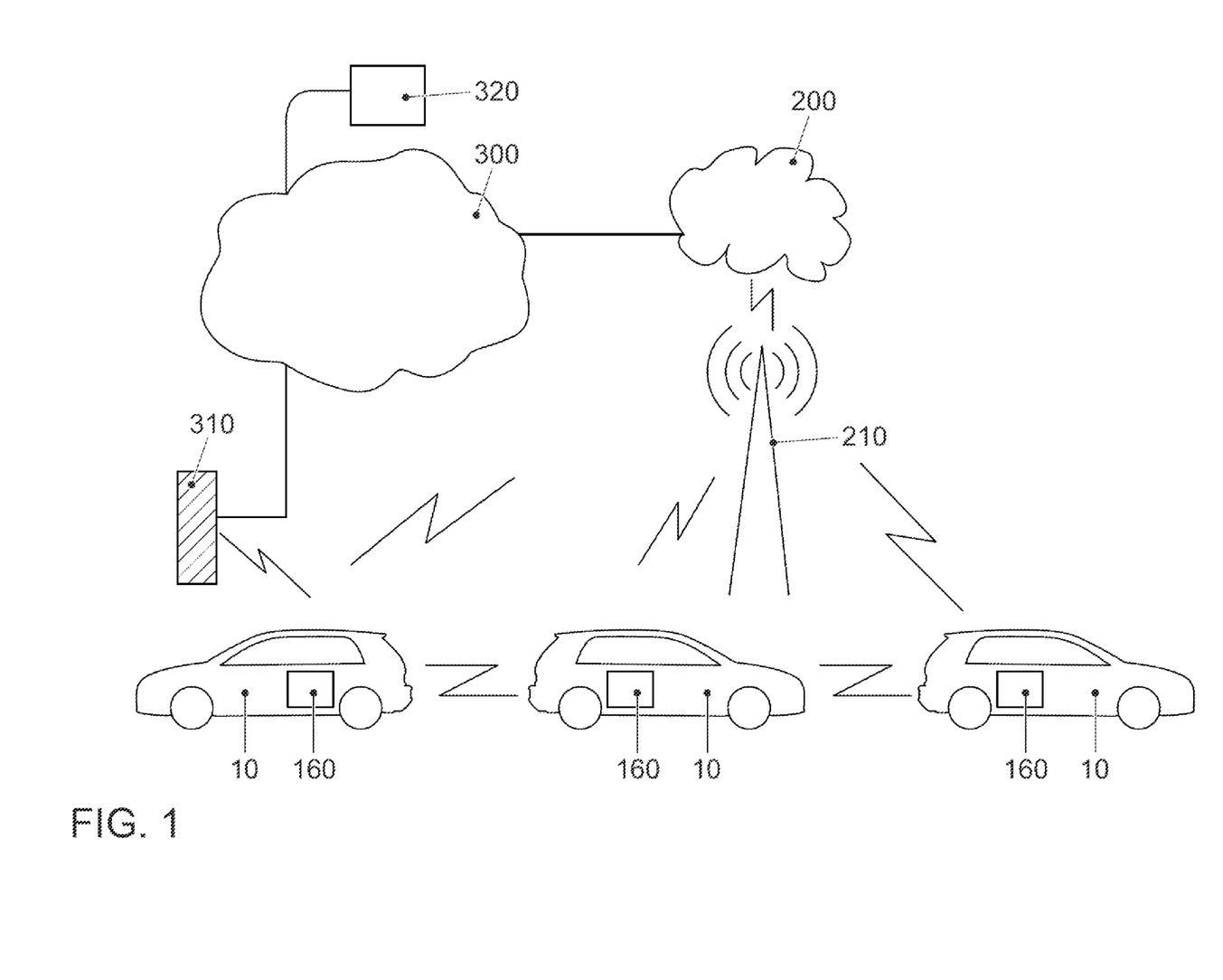
FIG. 1 shows a representation of the entire system with a number of fleet vehicles which are connected via mobile radio communication to the Internet and communicate with a backend server which is accessible on the Internet.

FIG. 1 shows the connection of transportation vehicles 10 via mobile radio communication to the Internet 300 and to an external central computing unit 320, referred to below as a backend server, which is accessible on the Internet 300.

Vehicle communication, also direct vehicle-to-vehicle communication, and possibly also vehicle-to-infrastructure communication, are required for the domains of cooperative driving maneuvers or autonomous driving. All three different communication types are shown in FIG. 1. The connection to the Internet 300 is established via mobile radio communication. A communication module 160 installed in the transportation vehicle 10 communicates with a mobile radio communication base station 210 in whose coverage area the transportation vehicle 10 is travelling. The base station 210 is connected via an EPC network 200 of the mobile radio communication operator, corresponding to Evolved Packet Core, to the Internet 300. The transportation vehicle 10 can thus communicate with the backend server 320 which is accessible on the Internet 300.

Mobile radio communication technologies of this type are standardized and reference is made here to the corresponding specifications of mobile radio communication standards. The 3GPP initiative and the LTE (Long Term Evolution) standard are cited here as a modern example of a mobile radio communication standard. Many of the associated ETSI specifications are currently available in version 14. The following can be mentioned as an example from version 13: ETSI TS 136 213 V13.0.0 (2016 May); this involves Evolved Universal Terrestrial Radio Access (E-UTRA); Physical Layer (3GPP TS 36.213 Version 13.0.0 Release 13).

LTE represents high data rates and short response times. The increase in the data rate is achieved in LTE through improved modulation methods, more flexible frequency usage and wider channel bandwidths. According to the specification, LTE currently has a data rate of more than 300 Mbit/s in the downlink and 75 Mbit/s in the uplink per 20 MHz band, mathematically and less overhead.

If the transportation vehicles need to exchange data with one another, vehicle-to-vehicle communication takes place. Different communication systems are available for this purpose. Examples include WLAN-based vehicle direct communication according to the IEEE 802.11p standard and vehicle direct communication in the mobile radio communication networks domain. In the fourth-generation mobile radio communication standard, corresponding to Long Term Evolution LTE, this option is referred to as LTE-V, in the case of the 5G initiative, this option is referred to as D2D, corresponding to device-to-device communication. In addition, vehicle-to-infrastructure communication also exists. Here, a transportation vehicle communicates with the infrastructure components, e.g., the road-side units RSU 310. If these infrastructure components are also connected to the backend server 320, communication with the backend server 320 can also take place via vehicle-to-infrastructure communication.

Figure 2:
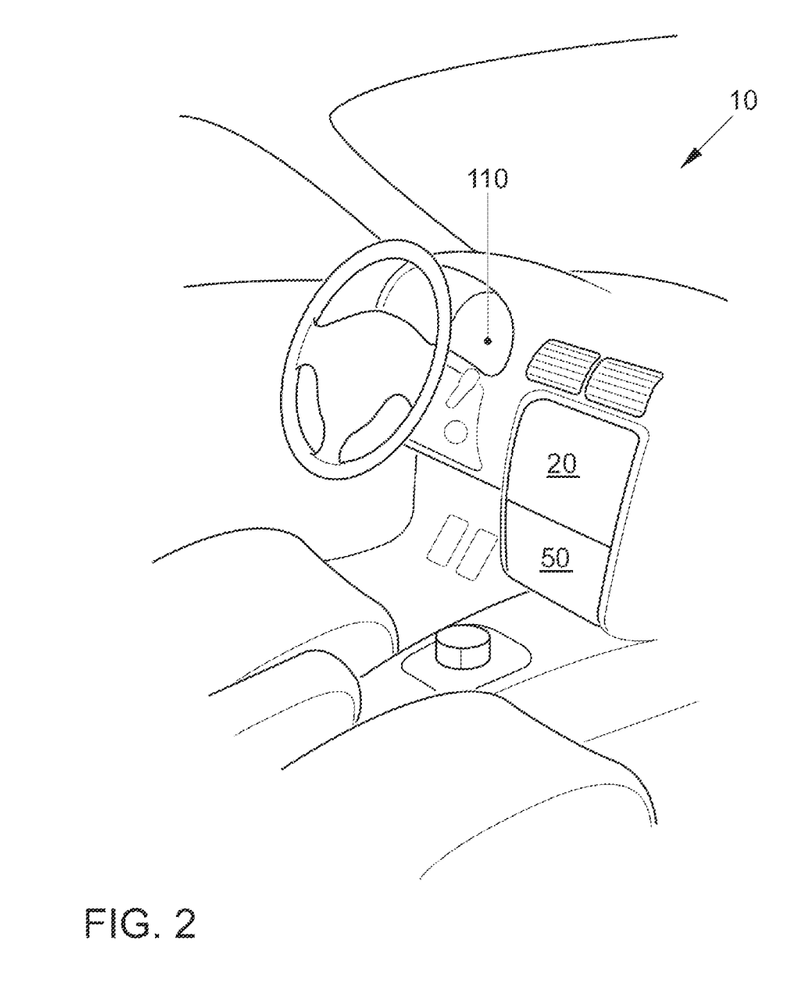
FIG. 2 shows the typical cockpit of a transportation vehicle.

FIG. 2 shows the typical cockpit of a transportation vehicle 10. A passenger transportation vehicle is represented. However, any other transportation vehicles could similarly be conceivable as the transportation vehicle 10. Examples of further vehicles are: Bicycles, motorcycles, buses, goods vehicles, in particular, trucks, agricultural vehicles, construction vehicles, rail vehicles, etc. The use of the disclosed embodiments would generally be possible in the case of agricultural vehicles, including robots, rail vehicles, watercraft and aircraft, including drones.

In the case considered, it is assumed that the transportation vehicle 10 is equipped with one or more driver assistance systems and provides a degree of automation from level 3 according to the VDA definition. One essential component of the cockpit is a display unit 20 of an infotainment system. This is a touchscreen 20 which is mounted in the central console. The touchscreen 20 serves, in particular, to operate functions of the transportation vehicle 10. For example, a radio, a navigation system, a playback of stored music pieces and/or an air conditioning system, other electronic devices or other comfort functions or applications of the transportation vehicle 10 can be controlled via the screen. These are often referred to collectively as an "infotainment system". In transportation vehicles, specifically passenger vehicles, an infotainment system refers to the combination of car radio, navigation system, hands-free device, driver assistance systems and further functions in a central operating unit. The term infotainment is a portmanteau, made up of the words information and entertainment. The touchscreen 20 is mainly used to operate the infotainment system, wherein this screen 20 can be easily viewed and operated, particularly by a driver of the transportation vehicle 10, but also by a front-seat passenger of the transportation vehicle 10. Mechanical operating elements, for example, buttons, rotary controls or combinations thereof, such as, for example, rotary/push-button controls, can further be arranged in an input unit 50 below the screen 20. A steering wheel operation of parts of the infotainment system is typically also possible. For this purpose, the transportation vehicles 10 are equipped with a multifunction steering wheel control. This unit is not shown separately, but is considered as part of the input unit 50. The large illustrated rotary/push-button control in the lower part of the central console is also considered as part of the input unit.

Figure 3:
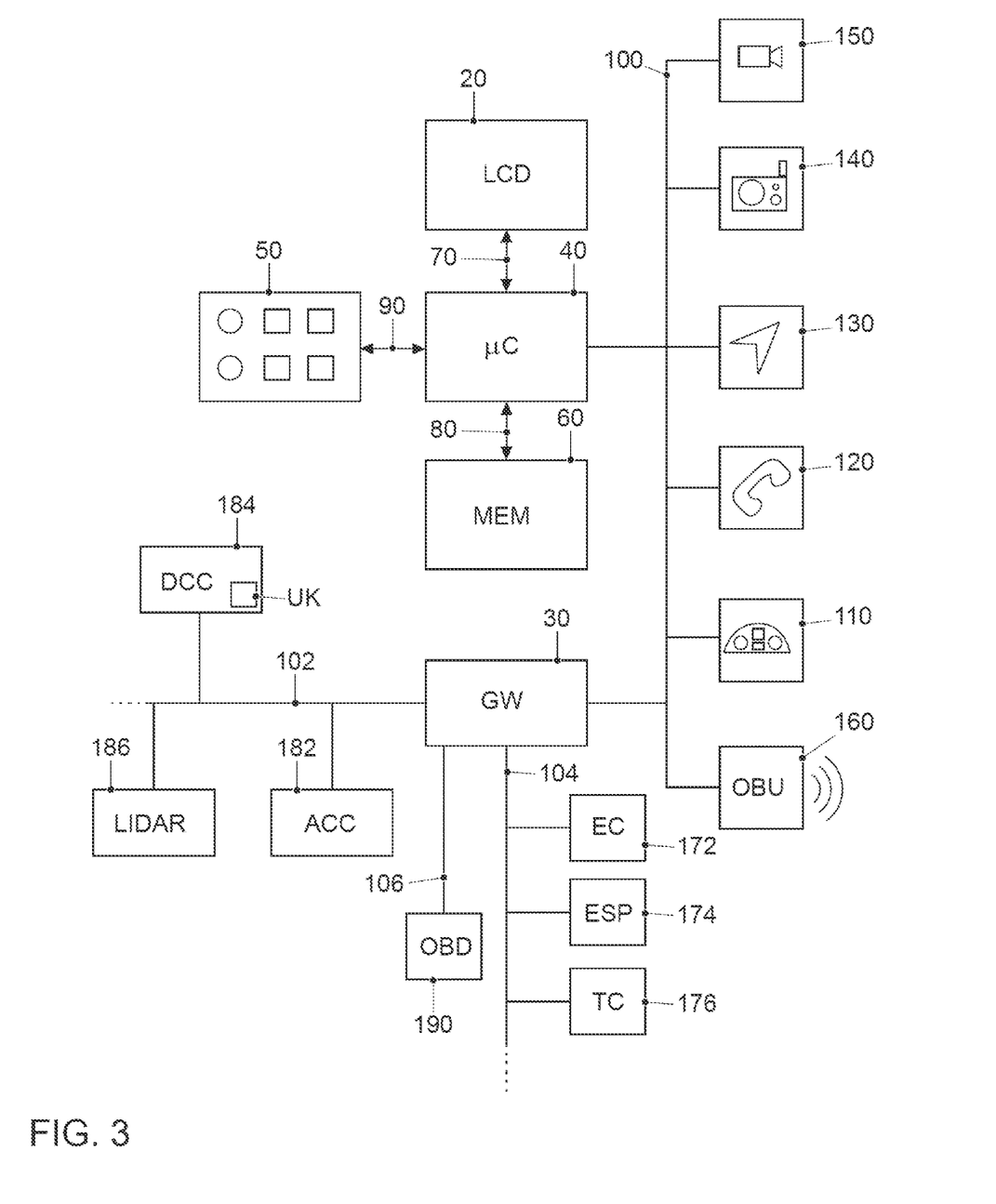
FIG. 3 shows a block diagram of the automotive electronics of the transportation vehicle.

FIG. 3 shows schematically a block diagram of the automotive electronics and, by way of example, some subsystems or applications of the infotainment system. Along with further components, the infotainment system comprises: the touch-sensitive display unit 20, a computing device 40, an input unit 50 and a memory 60. The display unit 20 comprises both a display area for displaying variable graphical information and a user interface (touch-sensitive layer) arranged above the display area for the input of commands by a user.

The display unit 20 is connected via a data line 70 to the computing unit 40. The data line can be designed according to the LVDS standard, corresponding to Low Voltage Differential Signaling. The display unit 20 receives control data from the computing device 40 via the data line 70 to control the display area of the touch screen 20. Control data of the entered commands are also transmitted via the data line 70 from the touchscreen 20 to the computing device 40. The input unit is denoted by the reference number 50. The operating elements already mentioned, such as buttons, rotary controls, slide controls or rotary/push-button controls by which the operating person can make inputs via the menu guidance are associated with the input unit. The term "input" is generally understood to mean entering a selected menu option, and also modifying a parameter, activating and deactivating a function, etc.

The storage device 60 is connected via a data line 80 to the computing unit 40. A pictogram directory and/or symbol directory is/are stored in the memory 60 with the pictograms and/or symbols for possible displays of additional information.

The further components of the infotainment system, i.e., the camera 150, radio 140, navigation device 130, telephone 120 and instrument cluster 110 are connected via the data bus 100 to the device for the operation of the infotainment system. The high-speed option of the CAN bus according to the ISO 11898-2 standard can be considered as the data bus 100. Alternatively, for example, the use of a bus system based on Ethernet technology, such as IEEE 802.03cg, could also be considered. Bus systems in which the data transmission takes place via optical waveguides are also usable. The MOST (Media Oriented System Transport) bus or the D2B (Domestic Digital Bus) are mentioned as examples. The transportation vehicle 10 is equipped with a communication module 160 for wireless internal and external communication. This module is also often referred to as an on-board unit or on-board connectivity unit. It can be designed for mobile radio communication, e.g., according to the LTE Standard, corresponding to Long Term Evolution. It can similarly be designed for WLAN communication, corresponding to Wireless LAN, either for communication with devices of the occupants of the transportation vehicle or for vehicle-to-vehicle communication, etc.

The communication bus 100 of the infotainment system is connected to a gateway 30. The other parts of the automotive electronics are also connected thereto. On the one hand, this concerns the communication bus 104 of the powertrain which is typically implemented as the CAN bus. The control units of the powertrain, i.e., the engine control unit 172, the ESP control unit 174 and the transmission control unit 176 are mentioned and shown as examples. This further concerns the communication bus 102 for driver assistance systems which can be designed as the FlexRay bus. Two driver assistance systems are shown: a driver assistance system 182 for adaptive cruise control ACC, a driver assistance system 184 for Dynamic Chassis Control DCC, and a LIDAR (Light Detection and Ranging) sensor 186. Furthermore, a communication bus 106 is also connected to the gateway 30. This bus connects the gateway 30 to an on-board diagnostic interface 190. The gateway 30 is responsible for performing the format conversions for the different communication systems 100, 102, 104, 106 so that the systems can exchange data with one another. In the example embodiment shown, the driver assistance system DCC makes use of a very precise map of the surrounding area for the driving task. In a first exemplary embodiment, the map of the surrounding area can be stored in advance in a memory of the driver assistance system DCC. For this purpose, it is normally loaded via the communication module 160, forwarded from the gateway 30 and written to the memory of the driver assistance system 184. In a different disclosed embodiment, only a section of a map of the surrounding area is loaded and written to the memory of the driver assistance system. This enables a smaller memory to be provided in the driver assistance system 184 and reduces costs. The very precise map of a surrounding area can already mean several gigabytes of data for a country such as Germany.

The transportation vehicle 10 is equipped with the two environment sensors: the video camera 150 and the LIDAR sensor 186. Even a plurality of video cameras 150 (front camera, rear camera, side camera left, side camera right) are typically installed in the transportation vehicle 10. It is thus possible to generate an all-round view of the transportation vehicle 10 through image processing. The LIDAR sensor 186 is typically installed in the front area of the transportation vehicle 10 and detects the surrounding area in the direction of travel of the transportation vehicle 10. In addition, ultrasound sensors and RADAR sensors could also be used.

The aforementioned environment sensors which are capable of detecting the surrounding area of the transportation vehicle are to be used for different distances and different purposes. The following indications of range and purpose generally apply:

- A stereo camera, range 500 m, serves to capture a 3D map, used for an automatic emergency braking assistant, lane change assistant, for traffic sign recognition and an ACC stop and go.
- Camera, range 100 m, serves to capture a 3D map, used for an automatic emergency braking assistant, lane change assistant, for traffic sign recognition, an ACC stop and go, for frontal collision warning, automatic light control and a parking assistant.
- Ultrasound sensor, range <10 m, parking assistant.
- Radar sensor, range 20 cm to 100 m, used for an automatic emergency braking assistant, for automatic speed control, an ACC stop and go, a blind spot assistant, a cross-traffic alarm transmitter.
- Lidar sensor, range 100 m, serves to capture a 3D map, used for an automatic emergency braking assistant.

Figure 4:
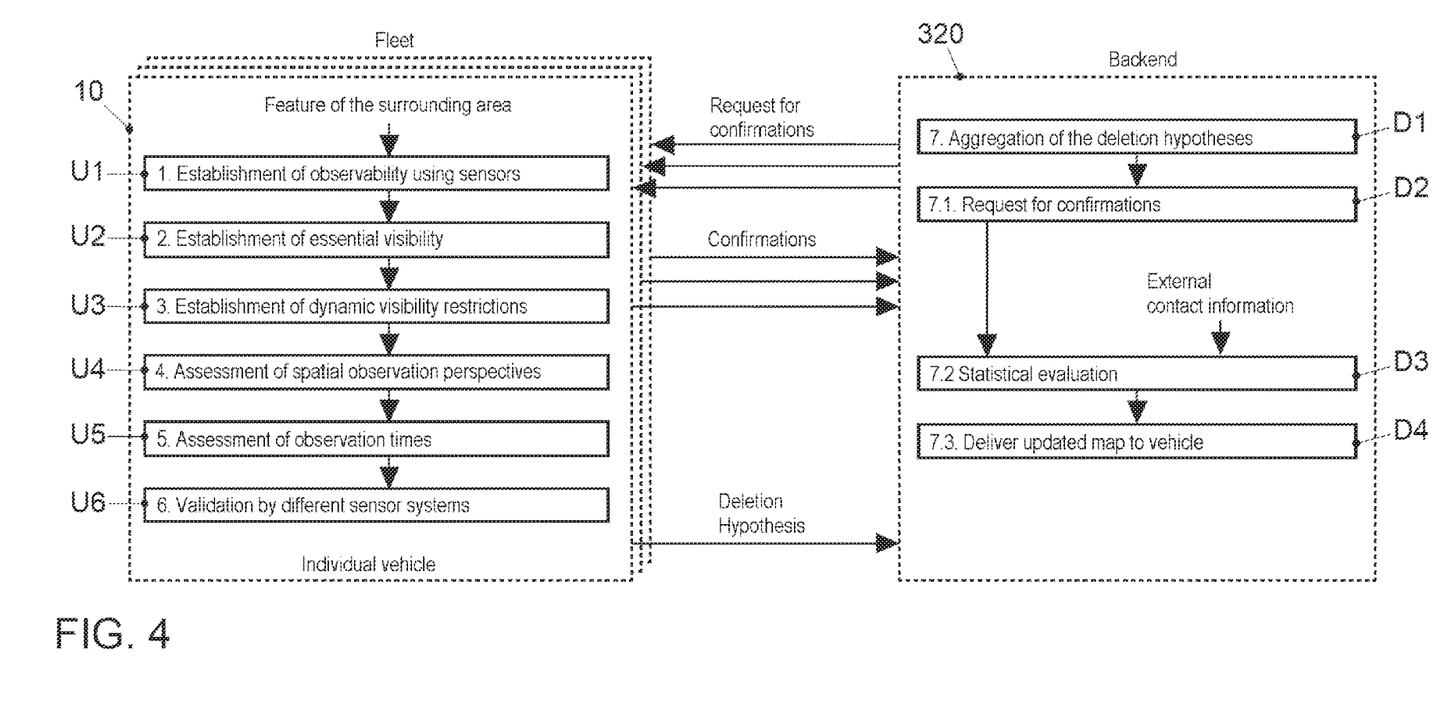
FIG. 4 shows the sequence of the method for automatic deletion of no longer existing landmarks in a map.

To determine whether a feature can be deleted from a map, the following method operations are executed which are explained by the flow diagram shown in FIG. 4.

FIG. 4 shows, on the left-hand side, the individual method operations which are executed in the transportation vehicle 10 of a transportation vehicle fleet. A group of transportation vehicles of an organization can generally be regarded here as a transportation vehicle fleet. It may involve the transportation vehicles of one or more particular transportation vehicle types of a transportation vehicle manufacturer. In this case, the owners of these transportation vehicles may also be the end customers. It would also be conceivable to regard all transportation vehicles having particular additional equipment as part of the transportation vehicle fleet.

The method operations which are executed in the backend server 320 are shown on the right-hand side.

The operations which are executed in the individual transportation vehicle 10 will first be described. The flow diagram for these operations can be regarded as a flow diagram for a computer program which is executed in a computing unit of the transportation vehicle 10. In at least one exemplary embodiment, the computing unit forms part of the driver assistance system 184. In a different disclosed embodiment, the program is executed by the computing unit 40 of the infotainment system. In operation at U1, a nearby feature of the surrounding area is first determined from the map. The position of the transportation vehicle 10 is at least roughly known via the GNSS system. A landmark, for example, can be considered as a feature of the surrounding area. A landmark is understood here to mean a clearly visible feature of the surrounding area. It may be a naturally occurring, usually highly visible, topographical object such as a tree, rocky outcrop, mountaintop and the like. Other examples include the aforementioned landmarks such as churches, towers, wind turbines, castles, but also landmarks installed at the roadside, such as traffic lights, road signs, traffic signs, street lamps, bridges, distance marks, edges of buildings.

In method operation at U1, it is determined whether the specific feature of the surrounding area is in fact detectable using the environment sensors 150, 186 of the transportation vehicle 10. A feature of the surrounding area is essentially observable if the sensor system of the transportation vehicle is physically capable of detecting it. A high-resolution camera type, for example, can discern more features of a surrounding area than a camera with a very low resolution. Observability with sensors depends on the respective sensor equipment of the transportation vehicle 10. More distant objects, for example, at a distance of 100 m and more can no longer be detected with ultrasound sensors. However, they can be detected with a video camera or LIDAR sensor. If only video cameras are installed, the landmarks cannot be detected in the dark.

In the second operation at U2, essential visibility is established. This means that it is assessed whether a feature of the surrounding area would essentially be visible from a specific position without additional interference. This would not be the case, for example, if a feature were to be concealed, for example, by a building which the transportation vehicle 10 is passing.

A feature of the surrounding area is then essentially visible from a position if a line-of-sight connection exists from this position without additional temporary or permanent concealment. Visibility is often restricted by buildings, road signs, the topology of the terrain, etc.

Figure 5:
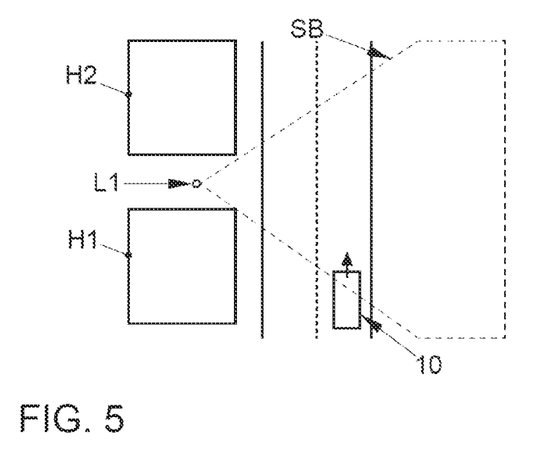
FIG. 5 shows a first example of the quantification of the visibility range of the landmark through indication of a visibility angle.

The novel proposal is therefore made here to indicate also the visibility range within which the feature of the surrounding area is visible from the road, in addition to the information relating to a feature of the surrounding area. FIG. 5 illustrates how this is intended, on the basis of an example. A landmark L1 is located there between two buildings H1 and H2 which have been built along a road. The visibility range is shown in grey and is denoted SB. The visibility range is dependent on the structure of the surrounding area. If information relating to the visibility range of a landmark is available, the transportation vehicle 10 can determine an expectation regarding the recognition of the landmark. How can the visibility range now be indicated in the map for the landmark L1?

Figure 6:
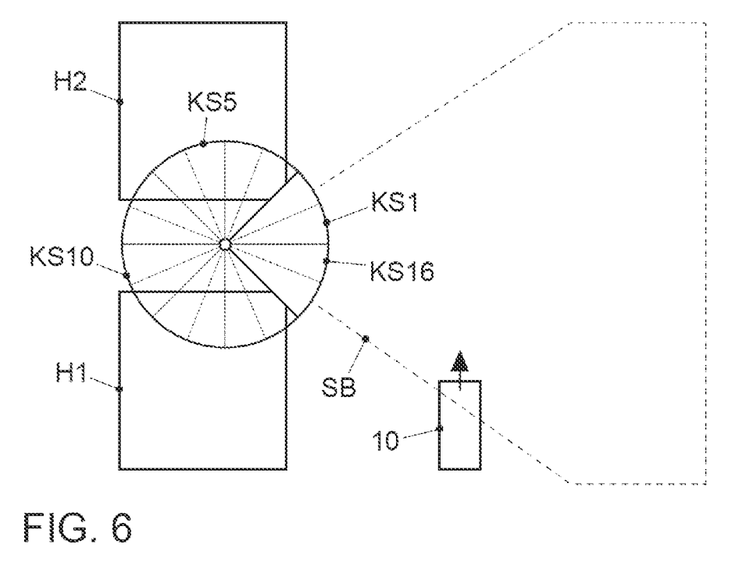
FIG. 6 shows a second example of the quantification of the visibility range of the landmark through indication of route segments.

Different representations are conceivable for this purpose. Option A (see FIG. 6) describes the representation of the visibility as an angle histogram. To do this, a circle in the center of which the landmark L1 is positioned is drawn around the landmark L1. The radius is dimensioned in the example shown in such a way that it corresponds to the distance from the landmark L1 to the edge of the roadway. In other examples, it can also be dimensioned differently. The circle is then divided into circle segments KS1-KS16. In the example shown, the circle is divided into 16 equally sized circle segments KS1-KS16. Each circle segment KS1-KS16 has an angle of 22.5°. When the visibility range is stored, the circle segments KS1-KS16 in which the landmark L1 is visible from the road are indicated, even if the landmark is not visible in the entire circle segment KS1-KS16. These circle segments KS15, KS16, KS1, KS2 are indicated in grey in FIG. 6. The visibility of a landmark is represented in this form as a histogram by way of visibility angles. The stored angles can be verified in runtime. A derivation via the geometric information in the map is initially possible.

Figure 7:
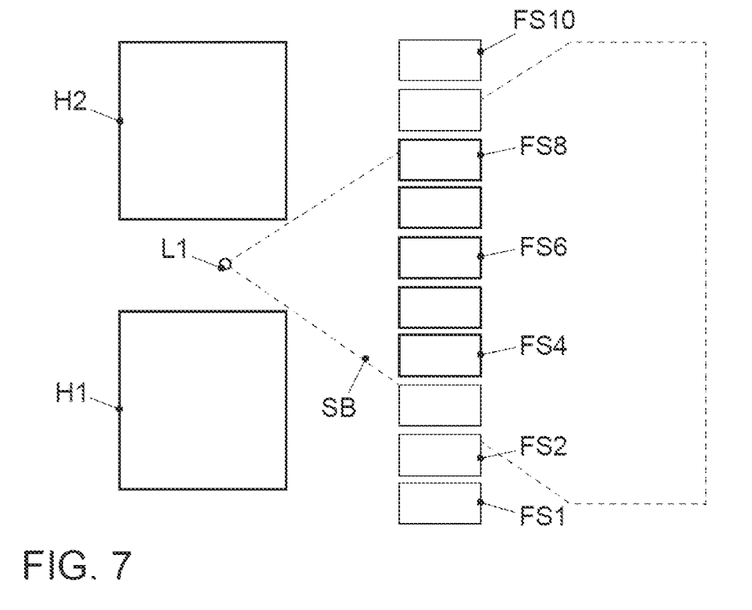
FIG. 7 shows a third example of the quantification of the visibility range of the landmark through indication of the simultaneously visible other landmarks.

In option B (see FIG. 7), it is proposed to divide the road into suitably sized roadway segments FS1-FS10 for which the features of the surrounding area that are visible from the respective road segment FS1-FS10 without additional interference are indicated in the map. However, the division is made here according to traffic lanes. The roadway segments FS1-FS10 or of a specific size. In the example shown in FIG. 7, the roadway segments FS1-FS10 from which the landmark L1 is visible are highlighted in grey. The size of the road segment FS1-FS10 can be defined variably, e.g., as a function of the distance from the landmark L1 to the road. In this form, the road is subdivided into segments. The segment IDs from which the landmark is visible are stored for each feature of the surrounding area.

Figure 8:
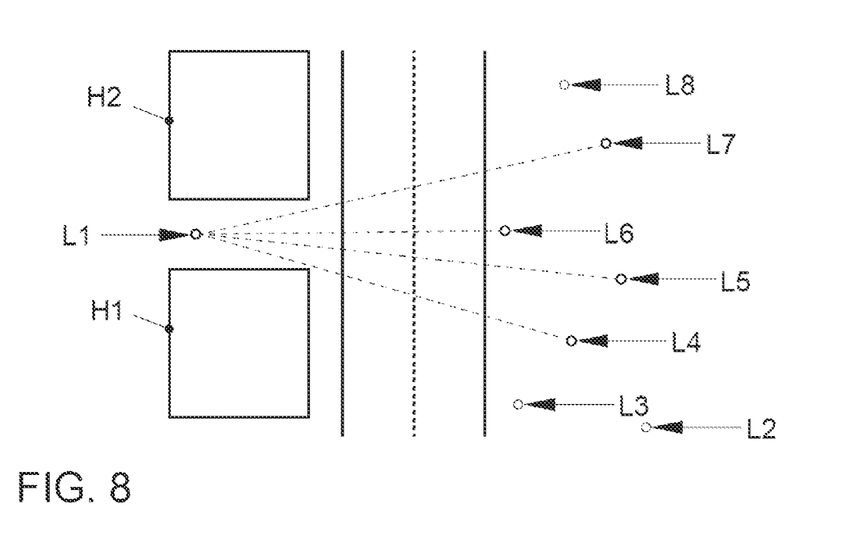
FIG. 8 shows an illustration of the problem of dynamic restriction of the visibility range when driving past a stationary or moving truck.

Furthermore, an indirect approach is also proposed in which, for each landmark, the further landmarks which have a line-of-sight connection to this landmark are stored. This option is shown in FIG. 8. For the landmark L1, information is stored indicating that a line-of-sight connection exists from it to the landmarks L4, L5, L6 and L7. The other landmarks that are simultaneously visible are stored for every feature of the surrounding area. An expectation as to whether a feature of the surrounding area ought to be visible can be indirectly determined as a result.

The following applies to all options: it is essentially conceivable that, in the case of a road with a plurality of traffic lanes, the visibility ranges to a feature of the surrounding area differ for the individual traffic lanes. It is therefore further proposed, if necessary, to indicate the visibility of a feature of the surrounding area for each traffic lane. For example, this is considered necessary for option B (see FIG. 7).

Figure 9:
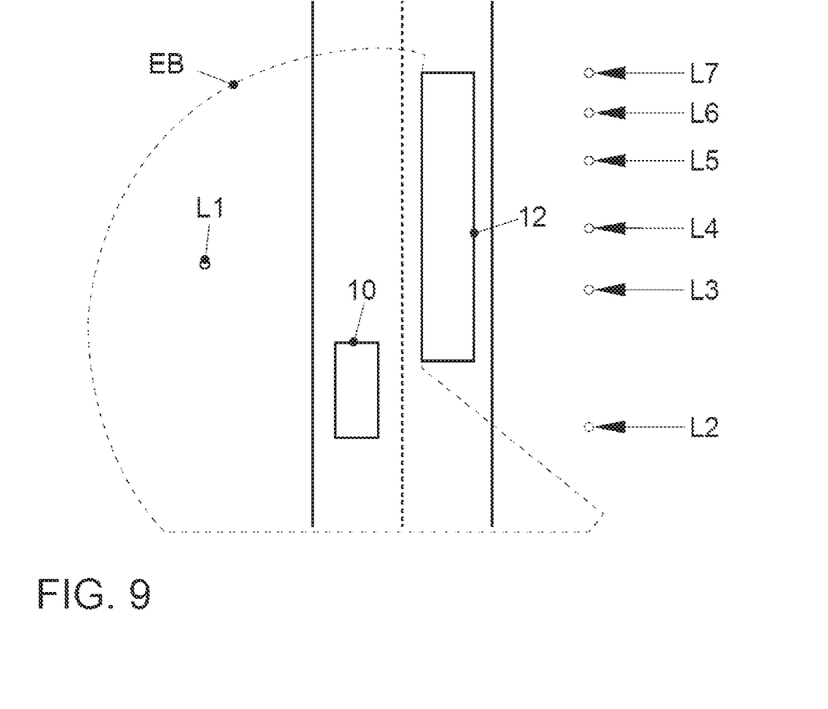
FIG. 9 shows a representation of a visibility range of a landmark which is located between two buildings of a row of buildings.

In the next operation at U3, it is assessed whether a feature of the surrounding area is concealed by other objects from a specific position. The problem is set out in FIG. 9. It is shown there that a transportation vehicle 10 is driving past a stationary or moving truck 12. The detection range for a sensor of the transportation vehicle is denoted EB in FIG. 9. The landmark L1 remains visible, whereas the other landmarks L2 to L7 are concealed by the truck 12 as it drives past. The appearance of the truck 12 is detected using sensors, e.g., through image evaluation of the images supplied by the video camera 150. Special object recognition algorithms are usable for this purpose. In the simplest case, the detection of landmarks is temporarily suspended when a concealment of this type is recognized.

The further operation at U4 concerns the detection of a feature of the surrounding area from different perspectives or from different locations. Before a landmark that is no longer recognized is deleted, it must be considered whether sufficiently different perspectives from which the landmark could have been seen have been taken into account. Features of the surrounding area are detected multiple times per second (e.g., 20 Hz), wherein the individual sensors are typically synchronized. The transportation vehicle 10 has travelled a speed-dependent distance between the individual detection times. This automatically results in the detection being carried out from different perspectives at the different times during the journey. However, only a short distance is covered at low and medium speeds. To simplify the detection, it is therefore proposed to specify a minimum interval of the measurements for the purpose of evaluating the absence of features of the surrounding area. It can be specified, for example, that the minimum travelling distance between two consecutive measurements should be 10 m.

The next operation at U5 concerns the multiple detection of a landmark at different times from the same transportation vehicle 10. To minimize the impact of temporary effects, measurements of the transportation vehicle from different journeys on the route and therefore measurements from different times could be evaluated during the assessment. A prerequisite for this is that the route is actually travelled again at a time interval which is not too long. This cannot generally be assumed, but journeys frequently take place repeatedly on the same routes for specific purposes (e.g., daily journey to work, to school, for shopping, for refueling, etc.). Following detection of the landmark L1, it would be investigated in this operation whether this landmark is located on such a route which is more frequently travelled according to the electronic driver's logbook. In this operation, the program then calculates a forecast indicating when the route will probably be travelled again. It then similarly detects the landmark L1 during the further journeys on this route. If enough observations are present, the observation can be classed as reliable.

In operation at U6, a feature of the surrounding area is also detected by different sensors of a transportation vehicle, e.g., when driving past, first by a front camera and later by a rear camera (correspondingly by, e.g., front lidar and rear lidar also) for additional corroboration.

The detection results from different transportation vehicle sensors are compared with one another to minimize sensor effects. A prerequisite for this is obviously that they are capable of detecting the same feature of the surrounding area. The detection results from different sensor types can thereby also be compared with one another. For example, both the LIDAR sensor 186 and the camera 150 detect pole-shaped features of the surrounding area (e.g., street lights).

After executing the different method operations, the transportation vehicle 10 generates a deletion hypothesis for a landmark which is still recorded in the map but which could not be recognized with the transportation vehicle sensor system. The deletion hypothesis could even be formulated after method operation at U2. However, it is transmitted to the backend server 320 only after the further corroboration in method operations at U4-U6. Operations at U5 and U6 are optional and can be included depending on the requirement and the equipment of the transportation vehicles.

As part of the assessment strategy, a decision must be made concerning the extent to which a landmark should be deleted on the basis of individual journeys of a transportation vehicle 10. Information from a plurality of journeys of one transportation vehicle or a plurality of transportation vehicles is compiled and evaluated in the backend server 320.

The backend server 320 can be operated by the service provider who supplies the maps of the surrounding area. The actual deletion of landmarks from the map is performed in the backend server. The map service provider will make the respectively up-to-date map available to the transportation vehicles. Since only map extracts are loaded in each case by the transportation vehicles 10, the deletion of a landmark only affects the map section in which it was previously recorded. Different method operations are performed in the backend server 320 before a landmark for which a deletion hypothesis has been transmitted from a transportation vehicle 10 is actually deleted.

These method operations shown in the right-hand part of FIG. 4 and are described in detail below.

Information from a plurality of transportation vehicles is compiled and evaluated in the backend to minimize the impact of temporary effects and detection errors. This is a decisive operation in avoiding an erroneous deletion of a feature of the surrounding area from the map. As soon as a transportation vehicle establishes on the basis of operations at U1-U6 that a feature of the surrounding area should be deleted, this deletion hypothesis is sent together with the boundary conditions of its determination (e.g., time, perspectives, sensors used, weather information if appropriate, etc.) to the backend server 320. These are first collected. This is done in operation at D1.

In the example embodiment shown, as soon as a sufficient number of transportation vehicles have transmitted a deletion hypothesis for a landmark, further transportation vehicles which are travelling in the vicinity of the landmark concerned are requested in operation at D2 to detect the landmark. Transportation vehicles which have not yet transmitted a deletion hypothesis are addressed here. When travelling the corresponding road sections, the requested transportation vehicles look out for the landmark no longer found by the other transportation vehicles. If they have found or have not found the landmark as recorded in the map, they transmit their report relating to their observation to the backend server 320 indicating the boundary conditions of the measurement (e.g., time, perspectives, sensors used, whether information if appropriate etc.). The information exchange can be anonymized for data protection reasons.

The statistical evaluation of the confirmations and deletion hypotheses is then performed in operation at D3. Since not only false positive messages (a feature of the surrounding area which has been recognized as present, but in reality is no longer present), but also false negative messages (a feature of the surrounding area which has been recognized as no longer present, but in reality is still present) are to be expected, the information collected by the backend server 320 is validated with statistical methods. The aim is to establish whether a feature of the surrounding area has actually been physically removed. For this purpose, in addition to the boundary conditions already received, external context information (e.g., weather conditions, information relating to roadworks, etc.) which does not originate from the transportation vehicle can be used. It can further be established whether a feature of the surrounding area can be recognized only by a specific class of sensors (e.g., as from a specific resolution) and not by other classes. In this case, the deletion hypothesis is not confirmed, but the feature of the surrounding area is nevertheless not detectable by specific transportation vehicles. In this case, it is therefore proposed to record corresponding additional information for the corresponding landmark in the map.

For this purpose, in the case of such features of the surrounding area, this sensor-dependent visibility information can be attached as an attribute to the feature of the surrounding area in the map. This then prevents the unnecessary transmission of deletion hypotheses to the backend server 320 by such transportation vehicles, since they can take account of this information in future in operation at U1.

If it is then confirmed by a plurality of further transportation vehicles that the landmark concerned could no longer be detected, the deletion hypothesis transmitted by the transportation vehicle 10 has been corroborated.

Finally, in operation at D4, the landmark is deleted if it was possible to verify the deletion hypothesis. An updated version of the map section concerned is created and made available to the transportation vehicles. In at least one example embodiment, as described, only map sections are loaded by the transportation vehicles. In another example embodiment, complete maps for one or more countries could be made available to the transportation vehicles through downloading.

All examples mentioned herein and also conditional wordings are to be understood without restriction to such specifically cited examples. It will thus be acknowledged by person skilled in the art, for example, that the block diagram shown here represents a conceptual view of an example of a circuit arrangement. Similarly, it is to be recognized that an illustrated flow diagram, state transition diagram, pseudocode and the like represent different options for representing processes which are essentially stored in computer-readable media and can therefore be executed by a computer or processor.

It should be understood that the proposed method and the associated devices can be implemented in various forms of hardware, software, firmware, special processors or a combination thereof. Special processors may comprise Application-Specific Integrated Circuits (ASICs), Reduced Instruction Set Computers (RISC) and/or Field Programmable Gate Arrays (FPGAs). The proposed method and the device may be implemented as a combination of hardware and software. The software may be installed as an application program on a program storage device. This typically involves a machine based on a computer platform which has hardware, such as, for example, one or more central units (CPU), a random-access memory (RAM) and one or more input/output (I/O) interfaces. Furthermore, an operating system is typically installed on the computer platform. The different processes and functions that have been described here may form part of the application program, or a part which is run via the operating system.

The disclosure is not limited to the example embodiments described here. There is scope for various adaptations and modifications which the person skilled in the art, due to his technical knowledge, would also consider as belonging to the disclosure.

REFERENCE NUMBER LIST

10 Transportation vehicle
20 Touchscreen
30 Gateway
40 Computing unit
50 Input unit
60 Storage unit
70 Data line to the display unit
80 Data line to the storage unit
90 Data line to the input unit
100 1st data bus
102 2nd data bus
104 3rd data bus
106 4th data bus
110 Instrument cluster
120 Telephone
130 Navigation device
140 Radio
150 Camera
160 Communication module
172 Engine control unit
174 ESP control unit
176 Transmission control unit
182 ACC control unit
184 Chassis control unit
186 Lidar sensor
190 On-board unit diagnostic connector
200 Evolved Packet Core
210 Mobile radio communication base station
300 Internet
310 Radio beacon
320 Backend central computer
U1-U5 Different operations which are executed in the transportation vehicle
D1-D4 Different operations which are executed in the backend server
H1-H2 Buildings
L1-L8 Landmarks
SB Visibility range
KS1-KS16 Circle segments
FS1-FS10 Roadway segments

The invention claimed is:

1. A method for updating a map of a surrounding area of a transportation vehicle, wherein the map is used in control of navigation of the transportation vehicle, the method comprising:

evaluating the map of the surrounding area as part of vehicle navigation;

controlling differentiated operation of sensors on the transportation vehicle based on whether the evaluation of the map of the surrounding area indicates a presence of a landmark being recorded in the map of the surrounding area, wherein the differentiated operation controls the sensors to perform sensor-based landmark detection only in response to the presence of the landmark being indicated in the map of the surrounding area;

in response to the sensors of the transportation vehicle being controlled to perform sensor-based landmark detection and unsuccessfully detecting a landmark indicated in the map of the surrounding area, developing a deletion hypothesis by the transportation vehicle to propose deletion of the indicated landmark presence in the map of the surrounding area;

transmitting the developed deletion hypothesis to an external central computer;

verifying the developed deletion hypothesis in the external central computer;

deleting the indication of the presence of the landmark from the map of the surrounding area in accordance with the deletion hypothesis in response to the verification of the deletion hypothesis; and updating the map of the surrounding area to generate an updated map by recording visibility range information for the indication of the landmark presence in the map of the surrounding area, the visibility range information indicating a range within which the landmark is visible from a road, wherein, thereafter, the visibility range information for the indication of the landmark presence is evaluated during subsequent evaluation of the updated map of the surrounding area to control whether sensor-based landmark detection should be performed as part of vehicle navigation at a determined location of the transportation vehicle in the updated map.

2. The method of claim 1, wherein the visibility range is recorded in the updated map of the surrounding area by indicating circle segments of a circle in a center of which the landmark is positioned.

3. The method of claim 1, wherein the visibility range is recorded in the updated map of the surrounding area by indicating the roadway segments of a roadway on which the transportation vehicle is travelling from which the landmark is detectable.

4. The method of claim 3, wherein the roadway segments have a defined length and only those roadway segments of the roadway on which the transportation vehicle is travelling in which the landmark remains completely detectable using the sensors during the journey through the roadway segment are recorded in the updated map of the surrounding area as the visibility range.

5. The method of claim 1, wherein the indication of the visibility range is recorded in the updated map of the surrounding area by indicating a number of further landmarks from which a line of sight to the verified landmark exists.

6. The method of claim 1, wherein the visibility range is indicated separately for the different traffic lanes of a roadway.

7. The method of claim 1, wherein a temporary concealment of landmarks by obstacles is detected and wherein the detection of landmarks using the sensors is suspended on those roadway sections on which an obstacle is recognized by which a line of sight to such landmarks is blocked.

8. The method of claim 1, wherein multiple, successive attempts at detection of the landmark are performed by the transportation vehicle to corroborate the developed deletion hypothesis, wherein, for the multiple, successive detection attempts, a minimum driving distance is predefined which the transportation vehicle must have travelled before the transportation vehicle attempts the next detection of the landmark.

9. The method of claim 8, wherein the deletion hypothesis is verified in response to a sufficient certainty existing that the deletion hypothesis is correct through statistical evaluation of the reports on the results of the attempts.

10. The method of claim 1, wherein, to verify the deletion hypothesis, a request is transmitted from the external central computer to a further transportation vehicles which are located in the area in which the indicated landmark presence is located, the further transportation vehicles then attempting to detect the indicated landmark using sensors and transmitting a report relating to results of the attempt to the external central computer.

11. A device for updating a map of a surrounding area of transportation vehicle in a central computer of the method of claim 1, the device comprising at least one computing device configured to update a map of the surrounding area and to record information relating to a visibility range for the indication of the landmark in the map of the surrounding area.

12. A device for use in the control of navigation of a transportation vehicle which updates a map of a surrounding area of the transportation vehicle, the device comprising:
at least one computing device configured to:
evaluate the map of the surrounding area as part of vehicle navigation;
control differentiated operation of sensors on the transportation vehicle based on whether the evaluation of the map of the surrounding area indicates a presence of a landmark recorded in the map of the surrounding area, wherein differentiated operation controls sensor-based landmark detection only in response to the presence of the landmark being indicated in the map of the surrounding area;
in response to the sensors of the transportation vehicle being controlled to perform sensor-based landmark detection and unsuccessfully detecting a landmark indicated in the map of the surrounding area, developing a deletion hypothesis by the transportation vehicle to propose deletion of the indicated landmark presence in the map of the surrounding area,
transmit the developed deletion hypothesis to an external central computer that verifies the developed deletion hypothesis, and deletes the indication of the presence of the landmark from the map of the surrounding area in accordance with the developed deletion hypothesis in response to the verification of the developed deletion hypothesis to update the map of the surrounding area to generate an updated map by recording visibility range information for the indication of the presence of the landmark in the map of the surrounding area, the visibility range information indicating a range within which the landmark is visible from a road,
wherein, thereafter, the visibility range information for the indication of the landmark presence is evaluated during subsequent evaluation of the updated map of the surrounding area to control whether sensor-based landmark detection should be performed as part of vehicle navigation at a determined location of the transportation vehicle in the updated map.

13. The device of claim 12, wherein the computing device evaluates the data from the sensors to determine whether landmarks are temporarily concealed by obstacles, and suspends the detection of landmarks using sensors on those roadway sections on which an obstacle by which a line of sight to such landmarks is blocked is identified through the detection using sensors.

14. The device of claim 12, wherein the at least one computing unit performs multiple, successive attempts at detection of the landmark to corroborate the developed deletion hypothesis, wherein, for the multiple, successive detection attempts, a minimum driving distance is predefined which the transportation vehicle must have travelled before the transportation vehicle attempts the next detection of the landmark.

15. A transportation vehicle, comprising the device of claim 12.

16. A non-transitory computer-readable storage medium in the device of claim 11, upon which a map of the surrounding area is stored including information relating to a visibility range for a landmark, wherein the information indicates the range within which the landmark is visible from a road.

17. A non-transitory computer-readable storage medium in the device of claim 12, upon which a map of the surrounding area is stored including information relating to a visibility range for a landmark, wherein the information indicates the range within which the landmark is visible from a road.

* * * * *